(12) United States Patent
Ayloo et al.

(10) Patent No.: US 9,027,100 B2
(45) Date of Patent: May 5, 2015

(54) CLIENT-SIDE AD CACHING FOR LOWER AD SERVING LATENCY

(75) Inventors: Kalyan Ayloo, Sunnyvale, CA (US); Daniel Wong, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1078 days.

(21) Appl. No.: 12/652,578

(22) Filed: Jan. 5, 2010

(65) Prior Publication Data

US 2011/0167486 A1 Jul. 7, 2011

(51) Int. Cl.
| | |
|---|---|
| G06Q 30/00 | (2012.01) |
| G06F 21/00 | (2013.01) |
| G06F 15/16 | (2006.01) |
| H04L 9/32 | (2006.01) |
| H04L 29/06 | (2006.01) |
| G06Q 10/00 | (2012.01) |
| G06Q 30/02 | (2012.01) |
| H04W 4/20 | (2009.01) |

(52) U.S. Cl.
CPC .... *H04L 63/0428* (2013.01); *G06F 2221/2115* (2013.01); *G06F 2221/2119* (2013.01); *G06Q 10/00* (2013.01); *G06Q 30/0261* (2013.01); *G06Q 30/0264* (2013.01); *G06Q 30/0269* (2013.01); *G06Q 30/0277* (2013.01); *H04W 4/20* (2013.01); *H04W 4/206* (2013.01)

(58) Field of Classification Search
CPC .......... G06Q 30/0261; G06Q 30/0269; G06Q 30/0277
USPC ............. 716/7, 4, 30; 705/14.4, 14.49, 14.58, 705/14.66, 14.73; 726/7, 4, 30
See application file for complete search history.

(56) References Cited

U.S. PATENT DOCUMENTS

| | | | |
|---|---|---|---|
| 7,720,432 B1 | 5/2010 | Colby et al. | |
| 2007/0088852 A1* | 4/2007 | Levkovitz | 709/246 |
| 2007/0271455 A1* | 11/2007 | Nakano et al. | 713/154 |
| 2008/0004954 A1* | 1/2008 | Horvitz | 705/14 |
| 2008/0066161 A1* | 3/2008 | Ohhira | 726/4 |
| 2008/0172741 A1* | 7/2008 | Reumann et al. | 726/23 |
| 2009/0031431 A1* | 1/2009 | Boccon-Gibod | 726/30 |

(Continued)

OTHER PUBLICATIONS

Index Cache Consistency in Client-Server Database Systems, Ibrahim Jaluta, IEEE 2006.*

(Continued)

*Primary Examiner* — Luu Pham
*Assistant Examiner* — Jahangir Kabir
(74) *Attorney, Agent, or Firm* — Hickman Palermo Becker Bingham LLP; Ellen Y. Wei (57) ABSTRACT

Advertisements are served over the Internet to clients on demand. A client module executing on a client device fetches advertisements over the Internet from an advertisement server. The client module stores these advertisements in a cache on the client device. When an application executing on the client device needs to display an advertisement, instead of contacting the advertisement server directly, the application makes a call to the client module. The client module, instead of contacting the advertisement server immediately, determines whether the cache on the client device contains any advertisements that satisfy criteria specified by the application. If the cache does contain advertisements that satisfy the criteria, then the client module provides those advertisements to the application. Otherwise, then the client module requests criteria-satisfying advertisements from the advertisement server at that time, and provides at least one of those to the application.

14 Claims, 3 Drawing Sheets

(56) References Cited

U.S. PATENT DOCUMENTS

| | | |
|---|---|---|
| 2009/0125376 A1* | 5/2009 | Sundaresan et al. ............ 705/10 |
| 2009/0222530 A1* | 9/2009 | Buford et al. ................. 709/217 |
| 2010/0058220 A1* | 3/2010 | Carpenter .................... 715/772 |
| 2010/0076849 A1* | 3/2010 | Bishop ........................ 705/14.64 |
| 2010/0228630 A1* | 9/2010 | Mikkelsen et al. ........ 705/14.66 |

OTHER PUBLICATIONS

IAC: Interest-Aware Caching for Unstructured P2P, Luo et al, IEEE 2007.*

* cited by examiner

CLIENT-SIDE AD CACHING FOR LOWER AD SERVING LATENCY

FIELD OF THE INVENTION

The present invention relates to Internet advertising and, more specifically, to a technique for reducing the latency with which advertisements are served to client devices over the Internet.

BACKGROUND

Mobile devices, such as mobile telephones (sometimes called "cell phones") and personal digital assistants ("PDAs"), are becoming used more are more frequently. These devices more and more often provide at least some Internet access to the users of those devices. Such a device typically is capable of executing application programs ("applications") that are stored on some storage mechanism of that device, such as a small hard disk drive, solid-state drive, memory card, or flash memory. In order to generate revenue, the developers of such applications sometimes code the applications to display advertisements (or "ads") to the users of those applications. However, if the advertisements remain the same over a longer period of time, then the advertisements might become stale or irrelevant.

In order to reduce the chance that an application will display a stale advertisement to the user of that application, an application developer might code his application to download an advertisement over the Internet from an advertisement server. Because the advertisement server's store of advertisements may be updated and refreshes from time to time, the advertisements that the application downloads from the advertisement server and displays to the application user are more likely to be fresh and relevant to the time at which the user uses the application.

Usually, though, an application will not attempt to download an advertisement until that application starts; indeed, until the application begins to execute on the client device, the application is not capable of attempting to download any advertisement. Because the application attempts to download one or several advertisements at the time that the application starts up, the time taken for the application to start up is increased. The application user typically finds the resulting delay to be detrimental to his experience in using the application. After instructing their client devices to start an application, users almost universally dislike waiting for long periods of time for their applications to load and start. However, if the application is coded in a way such that the presentation to the user will not be complete until the application has an advertisement to display to the user, then the application really cannot continue to execute until the application has obtained an advertisement from the advertisement server.

The delay referred to above is increased, and the detriment to the application user's experience is exacerbated, when the client device for one reason or another does not have access to high-speed Internet. There are various reasons why a client device's connection to the Internet might be slow. The client device, being small and mobile, and relatively inexpensive, might not have been designed with the most advanced network communication interfaces. Additionally, because such devices are mobile, the manner in which those devices communicate over the Internet is usually wireless. Wireless Internet communications are more susceptible to interference and poor signal strength than are communications that travel over guided media. As a result, mobile client devices that access the Internet wirelessly often suffer from increased latency, which causes applications executing on those mobile device to have to wait longer to obtain advertisements over the Internet. Even devices which are not mobile may experience increased communication latency if those devices are situated in regions in which the Internet communications infrastructure has not yet matured.

Under some circumstances, a mobile device user might be traveling from an area where a wireless Internet connection is available into another area where that wireless connection is unavailable. If the mobile device attempts to download an advertisement while the user is in an area where the wireless connection is unavailable, then the download may fail, and the advertisement might not display in the application at all.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Advertisements are served to clients on demand over the Internet. A client module executing on a client device fetches advertisements over the Internet from an advertisement server. The client module stores these fetched advertisements in an advertisement cache on the client device. When an application executing on the client device needs to display an advertisement within that application, instead of contacting the advertisement server directly, the application makes a call to the client module. The client module, instead of contacting the advertisement server immediately, determines whether the advertisement cache on the client device contains any advertisements that satisfy criteria specified by the application. If the advertisement cache does contain advertisements that satisfy the criteria, then the client module provides at least one criteria-satisfying advertisement to the application. Alternatively, if the advertisement cache does not currently contain any advertisements that satisfy the criteria, then the client module requests criteria-satisfying advertisements from the advertisement server at that time, and provides at least one of those to the application.

Beneficially, techniques described herein reduce the substantial latency that often afflicts applications that serve, to users, advertisements obtained over the Internet. The techniques are especially useful when the application executes on a client device that does not have high-speed Internet access. Such client devices lacking high-speed Internet access might include some older mobile phones and other older mobile devices. Techniques described herein are also especially useful in developing countries, where high-speed Internet access might not be available to users of any devices, mobile or not.

Although embodiments of the invention are highly applicable to mobile phones and personal digital assistants, embodiments of the invention also may be applied to other movable computing devices, such as laptop computers, notebook computers, and netbook computers, any of which might be equipped with a wireless network interface through which they can access the Internet when a suitable wireless access point is available.

Web Service Calls for Advertisements

According to one embodiment of the invention, a web browser application downloads and displays a web page. The web page contains one or more slots or regions into which advertisements can be placed for display. However, those advertisements are not inherently a part of the web page itself. Instead, any number of different advertisements could potentially be selected for display in any given slot or region within the web page. Indeed, with each different display of the web page, a particular slot or region may have a different advertisement placed within it.

In one embodiment of the invention, the source code of such a web page contains, for each advertisement slot, special code that performs a web services call when executed. Such a web services call may be formatted according to the Simple Object Access Protocol (SOAP), for example. Alternatively, such a web services call may be implemented through Representational State Transfer (REST) web services. In one embodiment, the web browser detects the existence of such special code in the web page and executes that special code. The web browser's execution of the code causes the web browser to send a request—referred to as "making a web services call"—to an advertisement web service that is supposed to send advertisements to the web browser. Under usual circumstances, such a web services call ends up being directed over the Internet to an advertisement server. The advertisement server, in response to the web services call, selects one or more advertisements that are stored at the advertisement server, and returns those advertisements over the Internet to the web browser. In response to receiving the advertisements over the Internet, the web browser places the advertisements within the advertisement slots on the page, thereby causing the advertisements to be displayed to the web browser's user.

However, one embodiment of the invention departs from these usual circumstances by interposing a special client module in between the web browser and the client device's Internet connection interface. As a result, in one embodiment, all requests that would ordinarily issue forth from the client device's Internet connection interface out onto the Internet are intercepted first by the client module executing on the client device. The client module may examine each intercepted request and handle that request based on the requests' type. Most requests, the client module may simply allow to pass through to the Internet connection interface without any further action on the part of the client module. However, when the client module detects that a request is a web services call for one or more advertisements, the client module may intervene and prevent that web services call from passing out through the interface and onto the Internet toward the advertisement server to which that call is addressed. In one embodiment of the invention, the client module is software that executes on the same client device as the web browser or other advertisement-seeking application, but is separate and distinct from that web browser or other application.

In one embodiment of the invention, when the client module detects that a request is a web services call for one or more advertisements, the client module examines advertisement criteria that may be specified in the call. In one embodiment, the call specifies, among other criteria, a dimension (e.g., in pixels) of each advertisement requested, along with a desired subject, topic, or context for each such advertisement. The subject, topic, or context specified may be one that matches that of the page or application into which the advertisement is to be placed, for example. The client module then consults an advertisement cache, which is also stored on the client device, to determine whether advertisements that satisfy these criteria are already contained within the cache. In response to determining that the advertisement cache already contains one or more advertisements that satisfy the criteria, the client module retrieves the criteria-satisfying advertisements from the cache and provides those advertisements to the requesting application (which, in the foregoing example, is the web browser application). The requesting application does not need to be modified or customized in order to compensate for the fact that the advertisements come, at least immediately, from the cache and the client module rather than from the advertisement server over the Internet. In one embodiment of the invention, the requesting application makes the same kind of web services call that the requesting application would have made even in the absence of the client module and the cache on the client device. Thus, in one embodiment of the invention, the requesting application may be said to be "unaware" of the client module's involvement in the advertisement requesting and serving process.

Alternatively, if the client module determines that the cache does not contain advertisements that satisfy the criteria specified by the web services call, then the client module forwards the request over the Internet to the advertisement server. The advertisement server locates, on the advertisement server, stored advertisements that satisfy the criteria, and returns these advertisements over the Internet. The advertisement server may either respond directly to the client module, in which case the client module will receive the advertisements, or the advertisement server may process the call as though the call came directly from the requesting application, in which case the client module may intercept the advertisements that come from the advertisement server and provide those advertisement to the requesting application. Again, the requesting application does not need to be "aware" that the client module was involved in the transfer of the advertisements from the advertising server. In response to receiving the advertisements from the client module, the requesting application places those advertisements into the advertisement slots, thereby displaying those advertisements to the user of the requesting application.

Contrast to Web Page Pre-Fetching

The foregoing technique may be contrasted with a web browser that proactively requests and caches other web pages to which a currently displayed web page links, even before a user has selected or activated any of the links on the currently displayed web page. Such other web pages are separate from the currently displayed web page, and the request for such other web pages is not a web services request (which may be formatted according to SOAP or some other formal web services protocol), but, instead, a simple Hypertext Transfer Protocol (HTTP) request. The other web pages may contain advertisements, but are not advertisements themselves. The other web pages are not placed into slots in the currently displayed page like the advertisements of certain embodiments of the invention are. While the actual display of other pre-fetched web pages requires a user to select or activate a link on the currently displayed web page in order to cause a web browser to display those other web pages, the cached advertisements of certain embodiments of the invention are displayed by an application even without any user specifically requesting the display of those advertisements. While a web browser may completely display a current web page even if other pages to which links on the current web page point have not yet been fetched and cached, in some cases, a web browser will not be able to display a web page completely unless the advertisements that are supposed to be contained on that web page have been obtained either from a cache or from an advertisement server.

Furthermore, there is no concept, in the context of pre-fetched web pages, of those web pages needing to satisfy criteria that are specified in a web services call. This differs from embodiments of the invention in which the advertisements that are obtained from either the advertisement server or from the advertisement cache are required to satisfy criteria such as dimension (e.g., in pixels) or topic, subject, or context. Information specified in the web service call, and upon which the advertisement selection also may be based, may include (a) an identity of a user of the requesting application (different advertisements may be selected for different users), (b) a time of day at which the requesting application is being used (different advertisements may be selected for different times of day), and (c) a user-specified location of the user of the client device or the actual location of the client device (potentially determined using global positioning system technology) at the time that the requesting application is being used (different advertisements may be selected for different user locations or client device locations). In the case of pre-fetched web pages, the web pages to which the currently displayed page links will not differ in different situations; the pre-fetched web pages to which a currently displayed page refers will always be the same, and will always be found at the same Uniform Resource Locators (URLs). As used herein, "criteria" does not refer to or include a URL of such a web page, and an "advertisement" is content which, if displayed in conjunction with a web page, is placed within that web page rather than being an entire web page itself. In contrast to the case of pre-fetched web pages, the client module and advertisement server of certain embodiments of the invention may return different advertisements to be displayed within a given application or web page at different times and on different occasions (especially since what is being advertised at any given moment is subject to change frequently in response to market demands). Additionally, in certain embodiments of the invention, the advertisements that are selected by the client module or the advertisement server are those that satisfy the criteria that are actually specified within the web services call. As used herein, an "advertisement" is content that is intended to help sell a product or service that is the subject of that content.

Advertisement Indexing in Cache

As is discussed above, in one embodiment of the invention, the web services call that the client module intercepts from the requesting application specifies criteria that desired advertisements ought to satisfy. Additionally, the web services call may identify other information that the client module can use to select an advertisement from the cache (or to request such an advertisement from the server). For example, the call may identify (a) the user of the application that is making the web services call, (b) the application that is making the web services call, (c) the specified location of the user of the application that is making the web services call, (d) the actual current location (e.g., determined by GPS) of the client device on which the requesting application is executing, (e) the current date, and/or (f) the current time of day.

In the advertisement cache on the client, the cached advertisements may be indexed according to one or more of these types of information, using such informational items as a key, to facilitate faster searching of the cache and more rapid retrieval and return of the advertisements contained therein. For example, some of the advertisements in the cache may be associated with certain holidays which occur on certain dates. If a web services call indicates such a date (or is received by the client module on such a date, even if the web services call does not indicate the date expressly), then, in one embodiment of the invention, the client module attempts to return, from the advertisement cache, an advertisement that is associated with that date.

Advertisements stored in the advertisement cache may be categorized based on demographic information, such as gender, race, age, educational level, income level, geographical location, etc. Advertisements stored in the advertisement cache may be indexed based on these demographic factors. When demographic information about the user of the requesting application is known, the web services call may specify such demographic information. In response to a web services call that specifies such demographic information, the client module may search the advertisement cache for an advertisement that is associated with as many of the user's demographics as possible, and return that advertisement to the requesting application in response to the web services call. Advertisements therefore may be highly targeted towards the user.

Advertisements stored in the advertisement cache may, additionally or alternatively, be categorized and indexed based on topics to which those advertisements pertain. For example, such categories may include cars, sports, news, etc. A web services call may specify that an advertisement pertaining to a specified topic should be returned. In response, the client module may attempt to find and return an advertisement that is associated with that specified topic in the advertisement cache.

Multiple-Application-Servicing Advertisement Cache

Multiple applications may execute on the client device. In one embodiment of the invention, multiple applications executing on the client device may request advertisements from the same advertisement cache, so that each separate application is not required to have its own separate cache. Some advertisements contained in the advertisement cache may be applicable for return to, and display by, multiple different applications that execute on the client device. Other advertisements contained in the advertisement cache may be applicable for return to, and display by, only certain kinds or types of applications. In one embodiment of the invention, each advertisement in the cache is associated with one or more application identifiers, and/or application types, to which that advertisement can be properly returned. In such an embodiment of the invention, the web services call specifies an application identifier, and/or an application type identifier. The client module, upon intercepting a web services call that specifies such an identifier, attempts to locate, in the advertisement cache, an advertisement that is also associated with the specified identifier. The client module, upon finding such an advertisement in the advertisement cache, returns that advertisement in response to the web services call.

In one embodiment of the invention, the requesting application is a web-browsing application. In such an embodiment, the application identifier discussed above, in addition to identifying that the requesting application is a web-browsing application, also specifies, as a sub-identifier, a "property" or "vertical" or category of a page into which the web-browsing application is attempting to place one or more advertisements by virtue of the web services call. A "property" or "vertical" is a sub-set of a web site that is devoted to a specific topic or category. Each such property or vertical may comprise one or more web pages. For example, if the web-browsing application is attempting to place advertisements into a web page that is associated with a "finance" property or vertical, then the web services call may specify "finance" as a sub-identifier to the application identifier. For another example, if the web-browsing application is attempting to place advertisements into a web page that is associated with a "sports" property or vertical, then the web services call may specify "sports" as a sub-identifier to the application identifier. In each case, the client module will seek to return, to the requesting application, an advertisement that is associated, in the advertisement cache, with both the call-specified application identifier and the call-specified property sub-identifier.

Thus, in one embodiment of the invention, the type of advertisement that the client module returns to the application may vary depending on the identity or type of application that makes the web services call. Web services calls originating from multiple separate applications executing on the same client device may be intercepted and processed by the same client module using the same client-side advertisement cache.

In an alternative embodiment of the invention, a single client module executes on the client devices, but the client module accesses several separate client-side advertisement caches. Each such advertisement cache may be associated with a separate requesting application, and the client module may select, for a particular requesting application, advertisements that are stored in the advertisement cache that is associated with that particular requesting application. In such an embodiment, advertisements contained in the advertisement cache associated with one application would not be shared with or provided to another application that is not specifically associated with that advertisement cache.

Time to Live

In one embodiment of the invention, to help ensure that a stale, outdated, or untimely advertisement is not returned by the client module, each advertisement in the advertisement cache is associated with both (a) a date on which that advertisement was placed in the cache and (b) a "time to live." The "time to live" (or "expiration date") is an amount of time, after the advertisement's arrival in the cache (or an absolute date and/or time), that the advertisement is considered to be fresh. In one embodiment of the invention, the client module periodically evicts, from the advertisement cache, all advertisements that have become stale due to their having been present in the advertisement cache for a period of time that exceeds their time to live values.

Due to limited storage of the client device, the client-side advertisement cache might be limited in size. Therefore, in one embodiment, when the requesting application needs additional advertisements that are not yet contained in a full cache (full due to the cache having reached the maximum allocated size), the client module evicts, from the cache, a sufficient quantity of criteria-unsatisfying advertisements to make room for criteria-satisfying advertisements that the requesting application needs. In determining which criteria-unsatisfying advertisements to evict from the cache, the client module may take into account the remaining time to live of each such advertisement; advertisements with the least time to live may be selected for eviction from the cache before other advertisements that are associated with greater times to live.

Initial Population of Advertisement Cache

In one embodiment of the invention, the advertisement cache on the client device starts out empty, with no advertisements stored therein. After the client module intercepts the first web services call for advertisements, the client module determines whether the advertisement cache contains any advertisements that satisfy the criteria and other requirements specified by the web services call. In response to determining that the advertisement cache does not contain any advertisements that satisfy these criteria and/or requirements, the client module forwards the call on, over the Internet, to the advertisement server. In one embodiment of the invention, before forwarding the web services call, the client module first modifies the web services call so that the web services call specifies the client module, rather than the requesting application, as the originator of the call, so that the advertising server will address a reply back to the client module rather than the originally requesting application. In an alternative embodiment of the invention, the client module forwards the web services call on to the advertisement server without any such modification. In such an alternative embodiment of the invention, the client module "listens" on the port on which the client device is configured to receive responses from the advertisement server (e.g., a TCP port that is specifically associated with web services calls) so that the client module can intercept replies from the advertisement server that are addressed to the requesting application. In such an alternative embodiment of the invention, the client module processes replies from the advertisement server, inserting any returned advertisements into the client-side advertisement cache, rather than forwarding those replies directly on to the requesting application.

When the client module receives or intercepts the web services call reply from the advertisement server, the client module extracts, from the reply, the advertisements that are contained in that reply. The client module places those advertisements into the advertisement cache, thereby populating the cache. The client module then selects, from the cache, one or more of the advertisements that satisfy the originally specified criteria and other requirements, and provides those advertisements to the requesting application on behalf of the advertisement server. To the requesting application, the advertisements appear to have come directly from the advertisement server rather than from the client module and client-side advertisement cache.

In one embodiment of the invention, the application itself is programmed or otherwise configured with information that specifies the average or maximum quantity of advertisements that the application is estimated to need during the entire period that spans one user session with that application. For example, if the application involves ten different "screens" or displays, each of which contains one advertisement slot, then the application may be programmed to request ten advertisements initially, even though the first screen that the application will display to the user only has one advertisement slot. The client module, determining that the client-side cache is initially empty (if it is), may then request those ten advertisements from the advertisement server, and store the ten advertisements in the client-side cache. The client module may return a single advertisement (for the first screen) from the cache to the client application. As the application displays or is about to display subsequent screens to the user, the application may request additional advertisements for those screens (e.g., one at a time) in subsequent web services calls, and the client module may fulfill those requests using advertisements that the client module previously cached as a result of the initial request (for ten advertisements) to the advertisement server.

In one embodiment of the invention, the initial request (web services call) for advertisements is made by the requesting application at the time that the requesting application first executes, even before the time that the application is ready to present the initial advertisement-slot-containing screen to the user. In such an embodiment, by the time that the requesting application is ready to present the first advertisement-slot-containing screen to the user, the client module will already have populated the client-side advertisement cache with enough advertisements to fill the slot(s) on that screen and subsequent screens that the application might later present to the user. Because the cache population is performed during application load time rather than during application run time, the application's user experiences much less latency due to advertisement presentation than he otherwise might have in the absence of this system and technique.

Furthermore, although such an embodiment of the invention might somewhat increase load-time latency during the very first execution of the application, due to the initial population of the client-side advertisement cache, later load-times of the same application might not necessarily involve any advertisement-fetching-related latency at all. This phenomenon is due at least in part to the fact that the application, during its very first execution, might not actually present all of its screens to the user, so at least some of the advertisements stored in the cache still can be retained and used during later executions of the same application (for when those unseen screens are eventually presented to the user). Furthermore, some applications may be able to re-use the same advertisements on the same (or even different) screens during subsequent executions, so that the only advertisement-fetching-related latency that a particular application might experience might be during the very first time that the application loads.

Moreover, in embodiments in which multiple applications are permitted to share advertisements from the same advertisement cache, there is the possibility that at least some of the advertisements that were placed into the cache as a result of a web services call from one application might be usable by other applications than the one that made the web services call. Therefore, in one embodiment of the invention, an application is programmed or other configured, upon initially loading, to first send a request to the client module to determine whether the client module already contains a specified number of advertisements (and/or a specified quantity of advertisements of a specified category or type). In such an embodiment of the invention, the application will only request additional advertisements, during load time, in response to the client module informing the application that the cache does not contain the specified quantity of advertisements. Under circumstances in which the client-side advertisement cache already contains advertisements that are suitable for the application's use, the application does not need to cause the client module or application server to return any mode advertisements to the client device.

In one embodiment of the invention, the application's initial web services call specifies both (a) a number of advertisements that are needed to fill advertisement slots on the first screen that the application is going to display and (b) a total number of advertisements that the application estimates are going to be displayed during the entire current session with the application's user. In response to receiving such a web services call, the client module initially only requests, from the advertisement server, enough advertisements to fill the advertisement slots on the first screen. The client module, after receiving these advertisements from the advertisement server, immediately returns these advertisements to the requesting application so that the requesting application can display those advertisements on the first screen with as little latency as possible. Then, asynchronously, even in the absence of any further web services calls from the requesting application, the client module subsequently requests, from the advertisement server, the remaining advertisements that are anticipated to be needed during the lifespan of the current user session with the requesting application. For client module receives these additional advertisements from the advertisement server "in the background" while the user is involved with the application. When the application is ready to present a subsequent advertisement-slot-containing screen to the user, the application then makes a subsequent web services call, which is intercepted by the client module and fulfilled using advertisements that the client module placed into the cache in between (a) the time that the application made the first subsequent web services call and (b) the time that the application made the subsequent web services call.

Criteria-Based Advertisement Matching

As is discussed above, in one embodiment of the invention, each web services call indicates one or more criteria and/or other requirements that advertisements ought to satisfy in order to qualify for return to the requesting application. However, under some circumstances, the client-side advertisement cache might contain advertisements that only partially match the criteria and other requirements specified by the web services call. In one embodiment of the invention, if advertisements currently contained in the client-side advertisement cache satisfy at least a threshold percentage or proportion of the web services call's specified criteria, then the client module returns those advertisement to the requesting application in response to the web services call even though those advertisements might not satisfy all of the call's specified criteria. For example, a client module, in one embodiment of the invention, might return an advertisement stored in the cache as long as the advertisement satisfies at least one of the criteria that are specified in the web services call.

In one embodiment of the invention, if the client-side advertisement cache contains only a fraction (less than all) of the criteria-satisfying advertisements that the web services call requests, then the client module immediately returns, to the requesting application, the cached advertisements that satisfy the criteria, and asynchronously requests the remaining needed criteria-satisfying advertisements from the advertisement server. As soon as the client module receives the remaining needed criteria-satisfying advertisements, the client module returns those advertisements to the requesting application. However, in an alternative embodiment of the invention, the client module does not return any advertisements to the requesting application until the client module is capable of returning the full quantity of advertisements that the web services call specified.

In one embodiment of the application, the client module interacts with multiple separate advertising servers over the Internet. Each such advertising server may be owned and operated independently by a different party. If one advertising server lacks advertisements that satisfy a web service call's criteria, then the client module may proactively request criteria-satisfying advertisements from other advertisement servers.

Insulation from Application

As is discussed above, in one embodiment of the invention, the application is essentially "unaware" that the requests are being intercepted by and fulfilled by the application server. In such an embodiment, the application sends web service requests toward the advertisement server as the application would have even in the absence of the client module described herein. However, in an alternative embodiment, the application is "aware" of the existence of the client module. In such an alternative embodiment of the invention, the application determines whether a client module is executing on the client device. If the application determines that the client module is executing on the client device, then the application directs web services calls locally to the client module. Alternatively, if the application determines that the client module is not executing on the client device, then the application instead directs web services calls directly to the advertisement server over the Internet.

In one alternative embodiment, in which the application is "aware" of the client module and expressly directs web services calls locally to the client module, the client module either responds with criteria-satisfying advertisements if such advertisements are currently contained in the cache, or responds with an indication that such advertisements are not currently contained in the cache if such advertisements are not. In such an embodiment of the invention, if the client module returns to the application an indication that the cache does not currently contain criteria-satisfying advertisements, then the client module asynchronously attempts to obtain such criteria-satisfying advertisements over the Internet from an advertisement server, caching those advertisements in the client-side advertisement cache upon success. This enables the client module to fulfill potential later requests from the application for advertisements that satisfy the same or similar criteria. Meanwhile, the application can deal with the client module's negative indication in any of a variety of programmer-specified ways. For example, in response to receiving, from the client module, an indication that the client-side cache does not contain the requested criteria-satisfying advertisements, then application may be programmed or otherwise configured to make subsequent web services calls for the needed advertisements directly to one or more advertisement servers over the Internet.

In one embodiment of the invention, the client module, when present, takes the form of a "toolbar" application that executes in conjunction with the client device's web browsing application. The "toolbar" application has access to the requests made by the web browsing application, and to the responses received by the web browsing application. In such an embodiment of the invention, the "toolbar" application detects when the web browsing application makes a web services call, and attempts to satisfy that web services call using content from the client-side advertisement cache. In such an embodiment, under circumstances in which the "toolbar" application has not been loaded or is not executing, the web services call will not be intercepted by the "toolbar" application, and will, instead, be serviced by the advertising server.

Encrypted Client-Side Cache

In one embodiment of the invention, the advertisements that are contained in the cache are stored in an encrypted manner, such that entities that have not authenticated themselves to the client module are incapable of modifying the contents of the cache or using the contents of the cache in any practical way. This encryption can be useful to prevent rogue applications, which might be secretly executing on the client device, from "hijacking" the cache and replacing the advertisements contained therein with their own preferred advertisements. In such an embodiment of the invention, the cache may be referred to as an "encrypted local store," or "ELS."

Thus, in one embodiment of the invention, each application that is going to interact with the client module first registers with the client module. As a result of the registration process, the client module provides the registered application with a set of application-unique credentials that the application can provide to the client module to prove to the client module that the application is authentic. Alternatively, during the registration process, the application may provide the client module with credentials (an application-unique "key") that are known and possessed only by the application (i.e., not any other application); the client module may then store these credentials, potentially also in an encrypted form, in association with the application's identity. In such an embodiment of the invention, whenever an application makes a web services call, the application additionally places, in the web services call, the application-unique credentials. The client module examines the provided credentials in order to authenticate the application. Only if the application is successfully authenticated does the client module fulfill the application's request for advertisements.

In embodiments of the invention in which the advertisements are stored in the client-side advertisement cache in an encrypted form, the client module initially receives the advertisements in an unencrypted form from the advertisement server. The client module then encrypts these advertisements (e.g., using private-key encryption) and stores the resulting encrypted advertisements in the client-side advertisement cache. After authenticating a requesting application, the client module decrypts the encrypted advertisements that satisfy the application's web services call, and returns the resulting decrypted advertisements to the application in response to the call. Thus, in one embodiment of the invention, the encryption and decryption of advertisements is performed by the client module.

In one embodiment of the invention, the client module stores, in the client-side advertisement cache, an association between each advertisement contained therein and the identity of the application that caused that advertisement to be requested and placed in the cache. In such an embodiment of the invention, the client module only returns an advertisement to an application if that advertisement is associated, in the cache, with the identity of that application. In other words, in such an embodiment of the invention, the client module prevents applications other than applications that caused a particular advertisement to be placed in the cache from requesting and receiving that particular advertisement from the cache.

Example Interface

In one embodiment of the invention, the web services call that the application makes is of the following general form:

```
ad_block getAdsViaCache(client_app_id, ad_call_params,
    max_num_ads, num_immediate_ads).
```

In the above call, "client_app_id" is the unique identifier of the application making the call, discussed in the section above relating to encryption of advertisements in the cache. In the above call, "ad_call_params" indicates criteria and requirements that the requested advertisements ought to satisfy, including elements such as a topic, subject, vertical, property, target age, target geographic region, target gender, target race, target income, target education level, time, date, dimensions, etc. In the above call, "max_num_ads" specifies the estimated maximum number of advertisements that the application expects to need to fill slots of all screens that are anticipated to be shown to the current user during the current lifetime of the user's session with the application. As is discussed above, some of these advertisements may be requested asynchronously if they are not needed for immediate display. In the above call, "num_immediate_ads" indicates the quantity of advertisements that the application needs relatively immediately in order to display within slots of a screen that the application will soon or is presently displaying to the application's user. As is discussed above, these are typically advertisements that the client module will request from the advertising server immediately (provided that those advertisements are not already in the client-side advertisement cache), before the remaining advertisements specified by "max_num_ads," so that the client module can reduce the latency experienced by the application's user while the application waits to receive those advertisements. In the above command, "ad_block" is a data structure identifier that at least temporarily will store the advertisements that the client module returns in response to the web services call.

In one embodiment of the invention, each advertisement stored in the "ad_block" is associated with a separate "ad_label." Each such "ad_label" may be specified in the "ad_call_params." Thus, in the "ad_call_params," different "ad_labels" may be associated with different criteria and requirements. When an advertisement that satisfies the criteria that are associated with a particular "ad_label" is stored in the "ad_block," it is stored in association with that particular "ad_label" so that there is no confusion as to which advertisement satisfied which set of criteria. The application may use the "ad_label" associated with each returned advertisement in order to place advertisements into the correct slots on a web page that or other screen that contains multiple advertisement slots.

Following is example pseudo-code that an application might use in order to request advertisements using the interface discussed above:

```
app_start( )
{
List ad_list = "stage1_ad, stage2_ad, stage3_ad";
ad_block adBlock = getAdsViaCache(client_app_id,
    ad_call_params, max_num_ads,
        num_immediate_ads);
}
//in a separate thread
for each stage in application
{
int i = 0;
my_ad = get_ad(ad_list[i]);
place_ad_in_app(my_ad);
i++;
}
```

Extensions and Alternatives

Although certain embodiments of the invention are described above in the context of web services calls specifically (such as SOAP and REST calls), alternative embodiments of the invention involve communication protocols other than web services calls specifically. For example, in one alternative embodiment of the invention, advertisement-requesting calls made by the application, and responses returned to those calls, are structured as HTTP requests and replies. Requests and replies may be structured according to any of a variety of formats, such as HTML or XML, and in conformity to any of a variety of communication protocols.

Although certain embodiments of the invention are described above in the context of advertisement retrieval, caching, and presentation specifically, alternative embodiments of the invention involve the retrieval, caching, and presentation of content other than advertisements specifically. For example, in one alternative embodiment of the invention, calls made by the application are for content other than advertisements, and replies to such calls contain content other than advertisements. Such content may include, for example, non-advertisement images, non-advertisement movies, non-advertisement audio, non-advertisement text, non-advertisement executable programs, etc. In such an alternative embodiment of the invention, the content requested, cached, and returned to the application might not be intended to help sell any product or service. Instead, such content may merely be informative or entertaining in nature and purpose.

However, certain embodiments of the invention are especially applicable to advertisements, as discussed above, due to the dynamic and time-sensitive nature that advertisements typically possess (qualities that are not necessarily possessed by other types of content).

Example System

Figure 1:
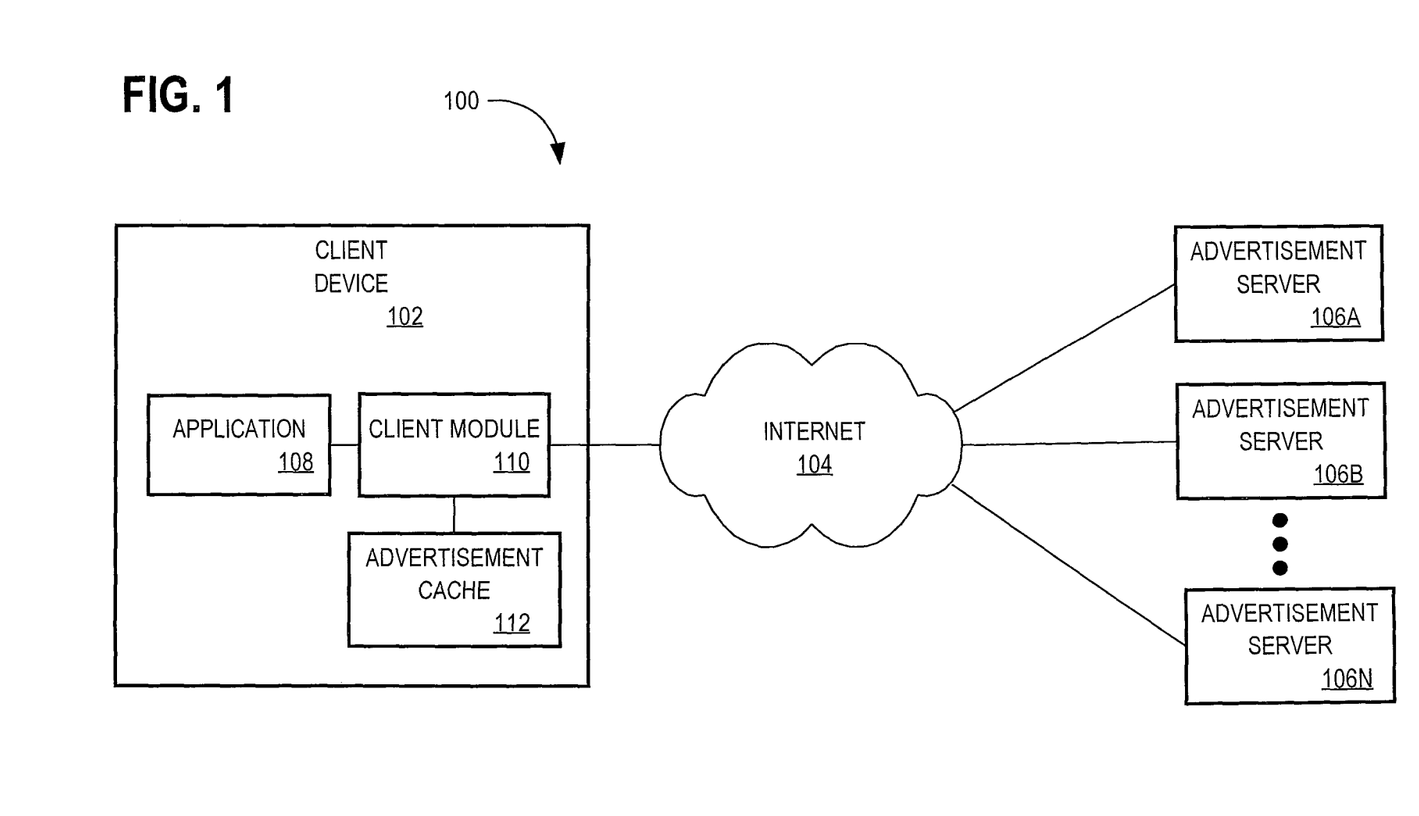
FIG. 1 depicts an example of a system in which a client module on a client device fetches advertisements from a set of advertising servers and locally caches those advertisements in a client-side advertisement cache on the client device on behalf of an application that is executing on the client device, according to an embodiment of the invention.

FIG. 1 depicts an example of a system in which a client module on a client device fetches advertisements from a set of advertising servers and locally caches those advertisements in a client-side advertisement cache on the client device on behalf of an application that is executing on the client device, according to an embodiment of the invention. System 100 includes client device 102, which is communicatively coupled (possibly via a wireless connection) to Internet 104, to which is further coupled a set of advertisement servers 106A-N. As is discussed above, client device 102 may be a mobile telephone (or "cell" phone), a personal digital assistant ("PDA"), a laptop computer, a notebook computer, a netbook computer, or any other mobile computing device. An example of such a computing device is discussed further below with reference to FIG. 3. Each of advertisement servers 106A-N stores one or more advertisements, each of which may be associated with one or more items of information that might or might not satisfy criteria that are specified in a web services call.

On client device 102 executes an application 108 (such as a web-browsing application) and a client module 110. As is discussed above, in one embodiment of the invention, client module 110 is a "toolbar" that executes in conjunction with a web-browsing application. Client module 110 intercepts web service calls from application 108—calls which otherwise would have been directed to one or more of advertisement servers 106A-N. In response to such web service calls, client module 110 determines whether criteria-satisfying advertisements are contained in a client-side advertisement cache 112, which is also stored on client device 102 (e.g., on a hard disk drive, removable memory card, or flash memory of client device 102). Client module 110 returns criteria-satisfying advertisements to application 108 from cache 112 if cache 112 contains those advertisements. If cache 112 does not contain those advertisements, then, in the illustrated embodiment of the invention, client module 110 modifies the intercepted web services call and sends the modified web services call over Internet 104 to one or more of advertisement servers 106A-N. In response to receiving advertisements that are stored on one or more of advertisement servers 106A-N, client module 110 immediately returns, to application 108, a subset of the advertisements that are needed immediately. As is described above, client module 110 may asynchronously request, from one or more of advertisement servers 106A-N, additional advertisements, which are not needed as immediately by application 108, and cache those advertisements in cache 112 for later use by application 108.

Example Technique

Figure 2:
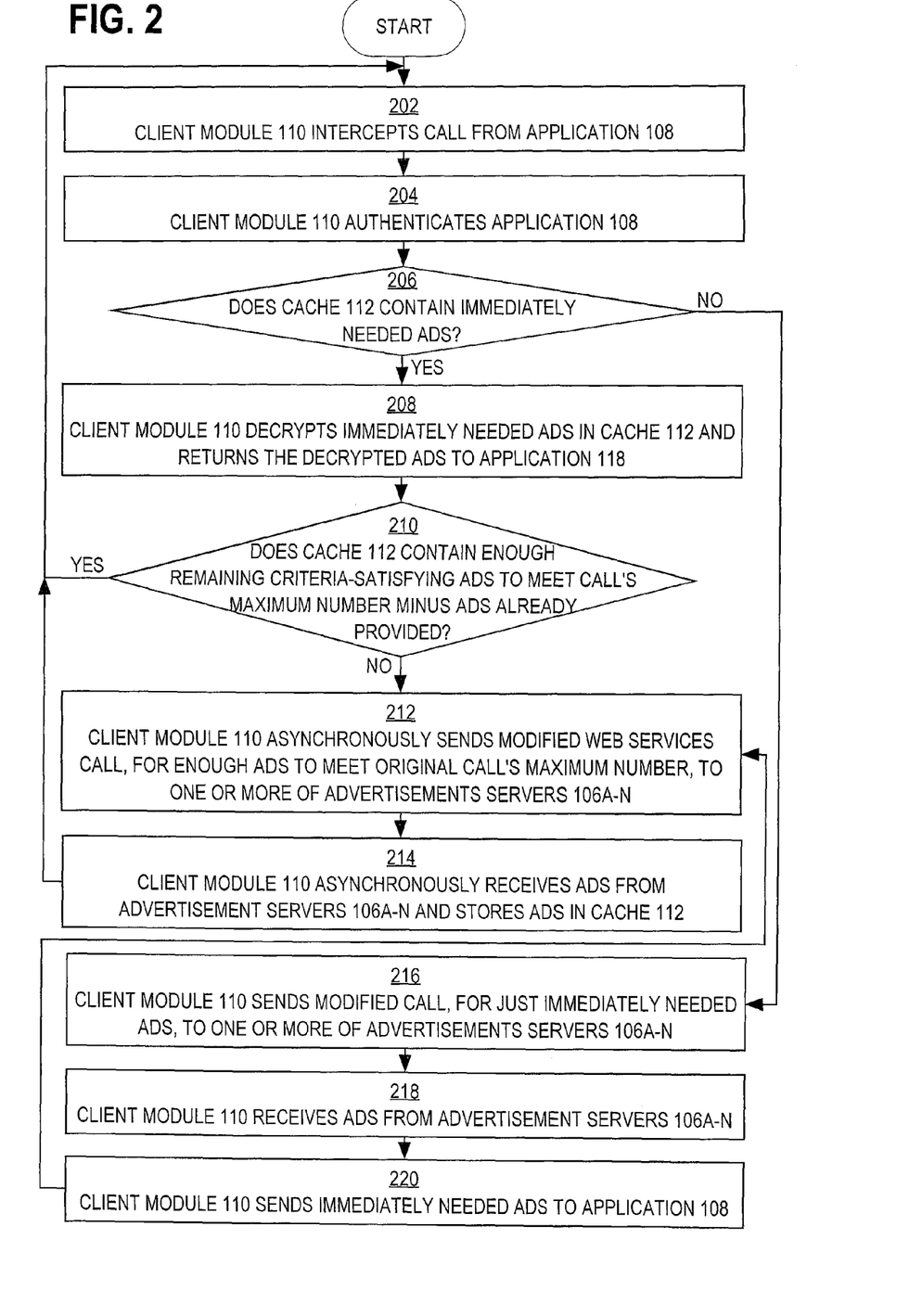
FIG. 2 depicts an example of a technique by which a client module on a client device fetches advertisements from a set of advertising servers and locally caches those advertisements in a client-side advertisement cache on the client device on behalf of an application that is executing on the client device, according to an embodiment of the invention.

FIG. 2 depicts an example of a technique by which a client module on a client device fetches advertisements from a set of advertising servers and locally caches those advertisements in a client-side advertisement cache on the client device on behalf of an application that is executing on the client device, according to an embodiment of the invention. In block 202, client module 110 intercepts a web services call from application 108. In block 204, client module 110 authenticates application 108 based on an application identifier specified in the web services call. In block 206, client module 110 determines whether cache 112 currently contains a number of call-specified-criteria-satisfying advertisements that is at least as great as the "immediately needed" number of advertisements specified by the web services call. If cache 112 currently contains at least the "immediately needed" quantity of call-specified-criteria-satisfying advertisements, then control passes to block 208. Otherwise, control passes to block 216.

In block 208, client module 110 decrypts the "immediately needed" call-specified-criteria-satisfying advertisements that are contained in cache 112, and returns decrypted versions of those advertisements to application 108. At that moment, application 108 may place those ads in web pages or screens and display those web pages or screens to a user of application 108. Control passes to block 210.

In block 210, client module 110 determines whether the difference between (a) the maximum number of requested advertisements specified in the web services call and (b) the number of advertisements returned to application 108 (e.g., in block 208) is more than (c) the quantity of call-specified-criteria-satisfying advertisements remaining in cache 112 (excluding advertisements already returned to application 108). If the difference between (a) and (b) is more than (c), then control passes to block 212. Otherwise, cache 112 already contains enough call-specified-criteria-satisfying advertisements, and control passes back to block 202.

In block 212, client module 110 asynchronously (relative to application 108) modifies the web services request and sends the modified web services request over Internet 104 to one or more of advertisement servers 106A-N. Modifying the web services request involves, among potentially other operations, changing the quantity of requested advertisements to reflect (a) minus (b) minus (c). In other words, client module 110 requests, from one or more of advertisement servers 106A-N, at least enough call-specified-criteria-satisfying advertisements to fill cache 112 with the maximum number of advertisements requested by the original web services call, minus any of the "immediately needed" advertisements that client module 110 already returned to application 108. While these operations are ongoing, application 108 may continue to interact with its user without any noticeable latency due to these operations. Control passes to block 214.

In block 214, client module 110 receives call-specified-criteria-satisfying advertisements from one or more of advertisement servers 106A-N over Internet 104, encrypts these received advertisements, and stores encrypted versions of the advertisements in cache 112. While these operations are ongoing, application 108 may continue to interact with its user without any noticeable latency due to these operations. Control then passes back to block 202.

Alternatively, in block 216, client module 110 modifies the web services request and sends the modified web services request over Internet 104 to one or more of advertisement servers 106A-N. Modifying the web services request involves, among potentially other operations, changing the quantity of requested advertisements to reflect just the quantity of "immediately needed" advertisements specified in the original web services request. In other words, client module 110 requests, from one or more of advertisement servers 106A-N, just enough call-specified-criteria-satisfying advertisements to meet the minimum number of "immediately needed" advertisements requested by the original web services call.

In block 218, client module 110 receives call-specified-criteria-satisfying advertisements from one or more of advertisement servers 106A-N over Internet 104. Control then passes to block 220.

In block 220, client module 110 immediately sends the advertisements received in block 218 to application 108. Client module 110 optionally may encrypt and store these advertisements in cache 112. Control then passes back to block 212.

Hardware Overview

Figure 3:
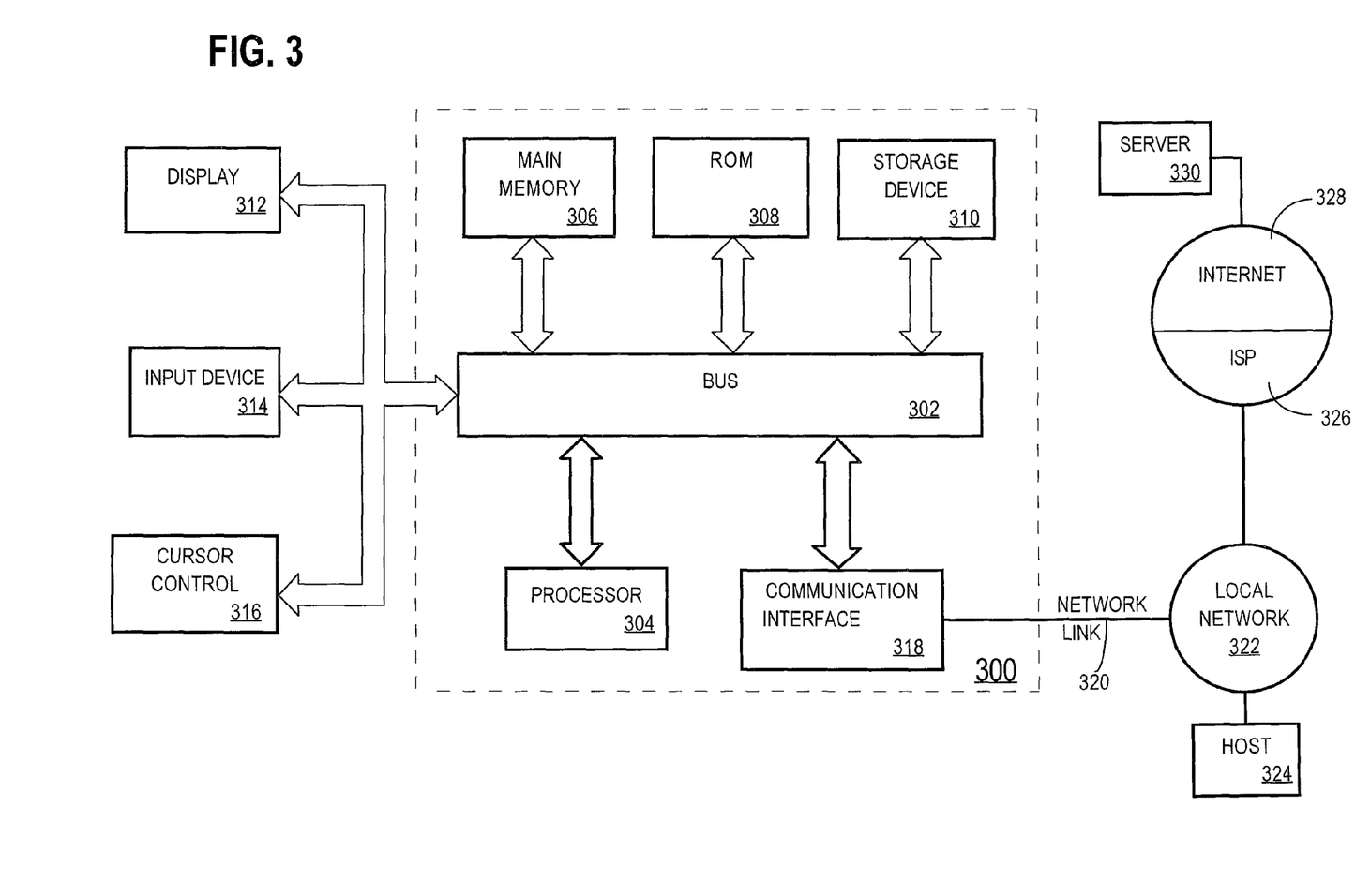
FIG. 3 is a block diagram of a computer system on which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
    performing a first request for one or more advertisements over one or more networks from an advertisement server;
    receiving the one or more advertisements over the one or more networks from the advertisement server in response to the first request;

storing the one or more advertisements in a cache on a client device, wherein the one or more advertisements are encrypted before storing;

after storing the one or more advertisements in the cache on the client device, intercepting, by a client module that executes on the client device, from an application executing on the client device, an advertisement request for advertisements that satisfy one or more criteria that are specified in the advertisement request;

wherein the advertisement request was directed by the application executing on the client device toward the advertisement server rather than toward the client module that executes on the client device;

authenticating, by the client module, a credential received from the application at the client device by comparing the credential with a stored credential;

in response to intercepting the advertisement request for advertisements that satisfy one or more criteria that are specified in the advertisement request, determining, at the client device, whether the cache on the client device contains any advertisements that satisfy the one or more criteria specified in the advertisement request; and in response to determining that the cache on the client device contains one or more particular advertisements that satisfy the criteria specified in the advertisement request, decrypting the one or more particular advertisements and providing the decrypted one or more particular advertisements to the application from the cache on the client device, instead of sending the advertisement request for advertisements that satisfy one or more criteria that are specified in the advertisement request to the advertisement server;

wherein the method is performed by one or more computing devices.

2. The computer-implemented method of claim 1, wherein the advertisement request for advertisements that satisfy one or more criteria that are specified in the advertisement request specifies both (a) a minimum number of advertisements and (b) a maximum number of advertisements, and the computer-implemented method further comprises:

in response to determining that the cache on the client device currently does not contain the minimum number of advertisements specified by the advertisement request, request a particular number of advertisements equal to the difference between the minimum number of advertisements requested and number of advertisements currently stored on the cache on the client device;

in response to receiving the particular number of advertisements from the advertisement server, returning the minimum number of advertisements to the application;

after returning the minimum number of advertisements to the application, and while the application is interacting with a user, asynchronously, relative to the application, requesting, from the advertisement server, an additional number of advertisements needed to fill the cache on the client device with a quantity of advertisements equal to the maximum number minus the minimum number;

receiving the additional number of advertisements from the advertisement server while the application is interacting with the user; and storing the additional number of advertisements in the cache on the client device.

3. The computer-implemented method of claim 1, wherein determining, at the client device, whether the cache on the client device contains any advertisements that satisfy the one or more criteria specified in the advertisement request comprises determining whether the cache on the client device contains any advertisements that have dimensions that are equal to dimensions specified by the criteria specified in the advertisement request.

4. The computer-implemented method of claim 1, wherein determining whether the cache on the client device contains any advertisements that satisfy the one or more criteria specified in the advertisement request comprises determining whether the cache on the client device contains any advertisements that are associated with a time period into which a current time, at which the determining is performed, falls.

5. The computer-implemented method of claim 1, wherein determining whether the cache on the client device contains any advertisements that satisfy the criteria specified in the advertisement request comprises determining whether the cache on the client device contains any advertisements that are associated with a geographical region in which the client device is currently located when the determining is performed.

6. The computer-implemented method of claim 1, wherein determining whether the cache on the client device contains any advertisements that satisfy the criteria specified in the advertisement request comprises determining whether the cache on the client device contains any advertisements that are associated with a user characteristic of a user of the application.

7. The computer-implemented method of claim 1, wherein the cache on the client device contains advertisements that are served to multiple different applications that execute on the client device.

8. One or more non-transitory computer-readable media storing instructions which, when processed by one or more processors, cause:

performing a first request for one or more advertisements over one or more networks from an advertisement server;

receiving the one or more advertisements over the one or more networks from the advertisement server in response to the first request;

storing the one or more advertisements in a cache on a client device, wherein the one or more advertisements are encrypted before storing;

after storing the one or more advertisements in the cache on the client device, intercepting, by a client module that executes on the client device, from an application executing on the client device, an advertisement request for advertisements that satisfy one or more criteria that are specified in the advertisement request;

wherein the advertisement request was directed by the application executing on the client device toward the advertisement server rather than toward the client module that executes on the client device;

authenticating, by the client module, a credential received from the application at the client device by comparing the credential with a stored credential;

in response to intercepting the advertisement request for advertisements that satisfy one or more criteria that are specified in the advertisement request, determining, at the client device, whether the cache on the client device contains any advertisements that satisfy the one or more criteria specified in the advertisement request; and in response to determining that the cache on the client device contains one or more particular advertisements that satisfy the criteria specified in the advertisement request, decrypting the one or more particular advertisements and providing the one decrypted or more particular advertisements to the application from the cache on the client device, instead of sending the advertisement request for advertisements that satisfy one or more criteria that are specified in the advertisement request to the advertisement server.

9. The one or more non-transitory computer-readable media of claim 8, wherein the advertisement request for advertisements that satisfy one or more criteria that are specified in the advertisement request specifies both (a) a minimum number of advertisements and (b) a maximum number of advertisements, and wherein the one or more non-transitory computer-readable media include additional instructions which, when processed by the one or more processors, cause:

in response to determining that the cache on the client device currently does not contain the minimum number of advertisements specified by the advertisement request, request a particular number of advertisements equal to the difference between the minimum number of advertisements requested and number of advertisements currently stored on the cache on the client device;

in response to receiving the particular number of advertisements from the advertisement server, returning the minimum number of advertisements to the application;

after returning the minimum number of advertisements to the application, and while the application is interacting with a user, asynchronously, relative to the application, requesting, from the advertisement server, an additional number of advertisements needed to fill the cache on the client device with a quantity of advertisements equal to the maximum number minus the minimum number;

receiving the additional number of advertisements from the advertisement server while the application is interacting with the user; and storing the additional number of advertisements in the cache on the client device.

10. The one or more non-transitory computer-readable media of claim 8, wherein determining whether the cache on the client device contains any advertisements that satisfy the one or more criteria specified in the advertisement request comprises determining whether the cache on the client device contains any advertisements that have dimensions that are equal to dimensions specified by the criteria.

11. The one or more non-transitory computer-readable media of claim 8, wherein determining whether the cache on the client device contains any advertisements that satisfy the one or more criteria specified in the advertisement request comprises determining whether the cache on the client device contains any advertisements that are associated with a time period into which a current time, at which the determining is performed, falls.

12. The one or more non-transitory computer-readable media of claim 8, wherein determining whether the cache on the client device contains any advertisements that satisfy the one or more criteria specified in the advertisement request comprises determining whether the cache on the client device contains any advertisements that are associated with a geographical region in which the client device is currently located when the determining is performed.

13. The one or more non-transitory computer-readable media of claim 8, wherein determining whether the cache on the client device contains any advertisements that satisfy the one or more criteria specified in the advertisement request comprises determining whether the cache on the client device contains any advertisements that are associated with a user characteristic of a user of the application.

14. The one or more non-transitory computer-readable media of claim 8, wherein the cache on the client device contains advertisements that are served to multiple different applications that execute on the client device.

* * * * *